(12) United States Patent
Nilsson et al.

(10) Patent No.: US 9,577,738 B2
(45) Date of Patent: Feb. 21, 2017

(54) RELAY DEVICE AND ASSOCIATED VEHICLE AND METHOD

(71) Applicant: TELEFONAKTIEBOLAGET L M ERICSSON (PUBL), Stockholm (SE)

(72) Inventors: Andreas Nilsson, Gothenburg (SE); Henrik Asplund, Stockholm (SE); Mikael Coldrey, Landvetter (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/764,329

(22) PCT Filed: Jan. 30, 2013

(86) PCT No.: PCT/SE2013/050072
§ 371 (c)(1),
(2) Date: Jul. 29, 2015

(87) PCT Pub. No.: WO2014/120054
PCT Pub. Date: Aug. 7, 2014

(65) Prior Publication Data
US 2015/0372747 A1 Dec. 24, 2015

(51) Int. Cl.
*H04B 7/15* (2006.01)
*H04B 7/155* (2006.01)
(Continued)

(52) U.S. Cl.
CPC ........... *H04B 7/1555* (2013.01); *H01Q 1/246* (2013.01); *H01Q 1/3216* (2013.01); *H01Q 25/00* (2013.01);
(Continued)

(58) Field of Classification Search
CPC ...... H01Q 1/246; H01Q 1/3216; H01Q 25/00; H01Q 25/005; H04B 7/1555; H04B 7/2606; H04W 88/02; H04W 88/08
(Continued)

(56) References Cited

U.S. PATENT DOCUMENTS 5,065,162 A * 11/1991 Akaba ................. G01S 3/32
244/17.17
5,960,074 A * 9/1999 Clark ..................... 370/310
(Continued)

FOREIGN PATENT DOCUMENTS

FI      WO 2012083539 A1 * 6/2012 ........... H04L 5/0023
WO     2012002852 A1     1/2012

OTHER PUBLICATIONS

Luo, et al., A CoMP soft handover scheme for LTE systems in high speed railway, EURASIP Journal on Wireless Communications and Networking, 2012, 9 pages.
(Continued)

*Primary Examiner* — Tan H Trinh

(57) ABSTRACT

It is presented a relay device arranged to act as a relay to provide relayed access for at least one wireless device within a vehicle to a cellular radio communication network. The relay device comprises: a relay node device comprising a vehicle antenna for communicating with the at least one wireless device; a first directional antenna directed in a first direction, the first directional antenna being connected to the relay node device; and a second antenna which is not directed in the first direction, the second antenna being connected to the relay node device. The first directional antenna and second antenna are arranged to communicate with fixed radio base stations of the cellular radio communication network; and the first direction is essentially par-
(Continued)

allel to a direction of travel of the vehicle. A corresponding vehicle and method are also presented.

10 Claims, 5 Drawing Sheets

(51) Int. Cl.
- *H01Q 25/00* (2006.01)
- *H04B 7/26* (2006.01)
- *H01Q 1/24* (2006.01)
- *H01Q 1/32* (2006.01)
- *H04W 88/02* (2009.01)
- *H04W 88/08* (2009.01)

(52) U.S. Cl.
CPC ......... *H01Q 25/005* (2013.01); *H04B 7/2606* (2013.01); *H04W 88/02* (2013.01); *H04W 88/08* (2013.01)

(58) Field of Classification Search
USPC ....... 455/25, 11.1, 16, 7, 9, 509, 418, 426.1, 455/67.11, 457, 437, 562.1, 18, 502, 500, 455/436; 375/211, 135, 137, 260, 329; 343/711; 370/315, 329, 331, 338, 310, 370/352, 308; 342/372
See application file for complete search history.

(56) References Cited

U.S. PATENT DOCUMENTS

| | | | | |
|---|---|---|---|---|
| 6,167,239 A * | 12/2000 | Wright | ............... | H04B 7/18506 340/945 |
| 6,639,520 B2 * | 10/2003 | Nomura | ........... | G08G 1/096775 340/905 |
| 6,757,521 B1 * | 6/2004 | Ying | ...................... | G05B 15/02 455/457 |
| 7,139,527 B2 * | 11/2006 | Tamaki | ................ | H04B 7/2606 455/11.1 |
| 7,327,980 B2 | 2/2008 | Hepsaydir | | |
| 7,398,083 B2 * | 7/2008 | Ying | .................. | G05B 23/0208 455/423 |
| 2003/0166393 A1 * | 9/2003 | Hepsaydir | ............ | H04B 7/0491 455/11.1 |
| 2004/0061652 A1 | 4/2004 | Ishihara | | |
| 2005/0108374 A1 * | 5/2005 | Pierzga | .............. | H04B 7/18504 709/223 |
| 2005/0174974 A1 * | 8/2005 | Sonntag | ................ | H04W 92/20 370/338 |
| 2005/0259619 A1 * | 11/2005 | Boettle | ................ | H04W 36/32 370/331 |
| 2006/0166618 A1 * | 7/2006 | Bakaimis | ............... | H04B 7/155 455/11.1 |
| 2007/0082672 A1 * | 4/2007 | Fujioka | .................... | H04B 7/26 455/436 |
| 2007/0161347 A1 * | 7/2007 | Ma | ..................... | H04B 7/18506 455/11.1 |
| 2007/0197230 A1 * | 8/2007 | Roggero | ............. | G08G 1/0965 455/456.1 |
| 2009/0140921 A1 * | 6/2009 | Bongfeldt | ............ | H01Q 1/1242 342/372 |
| 2010/0202565 A1 * | 8/2010 | Abbasfar | ............ | H04L 27/2014 375/308 |
| 2010/0234071 A1 * | 9/2010 | Shabtay | ................ | H04B 7/0408 455/562.1 |
| 2010/0297937 A1 | 11/2010 | Kim | | |
| 2011/0009056 A1 * | 1/2011 | Hanson | ............... | H04B 7/15535 455/9 |
| 2011/0287789 A1 * | 11/2011 | Yang | ......................... | G01S 1/12 455/500 |
| 2012/0315916 A1 * | 12/2012 | Van Phan | ............. | H04W 36/08 455/442 |
| 2013/0059589 A1 * | 3/2013 | Dalsgaard | ............. | H04W 36/32 455/437 |
| 2013/0069834 A1 * | 3/2013 | Duerksen | ................. | H01Q 1/32 343/711 |
| 2013/0102312 A1 * | 4/2013 | Nilsson | ................ | H04B 7/1555 455/436 |
| 2013/0189945 A1 * | 7/2013 | Rijnsburger | ............ | H04W 4/22 455/404.2 |
| 2013/0260760 A1 * | 10/2013 | Pan | ........................ | H04W 36/32 455/436 |
| 2013/0301604 A1 * | 11/2013 | Skov | ..................... | H04L 5/0023 370/329 |
| 2014/0038582 A1 * | 2/2014 | Horneman | ............ | H04W 76/02 455/418 |
| 2014/0045491 A1 * | 2/2014 | Van Phan | ........... | H04W 84/005 455/426.1 |
| 2014/0134942 A1 * | 5/2014 | Yu | ......................... | H04W 24/02 455/7 |
| 2014/0135006 A1 * | 5/2014 | Yu | ......................... | H04W 24/02 455/436 |
| 2014/0135007 A1 * | 5/2014 | Yu | ......................... | H04W 36/00 455/436 |
| 2014/0135008 A1 * | 5/2014 | Yu | ......................... | H04W 24/02 455/436 |
| 2014/0204832 A1 * | 7/2014 | Van Phan | ............. | H04W 16/26 370/315 |
| 2014/0211688 A1 * | 7/2014 | Bakker | ................. | H04W 48/16 370/315 |
| 2014/0321357 A1 * | 10/2014 | Kwon | .................. | H04B 7/2606 370/315 |
| 2014/0349569 A1 * | 11/2014 | Hyde | ................... | H04B 7/1555 455/11.1 |
| 2015/0181502 A1 * | 6/2015 | Hans | ..................... | H04W 40/22 455/437 |
| 2015/0304016 A1 * | 10/2015 | Choi | .................... | H04B 7/2606 455/11.1 |

OTHER PUBLICATIONS

Tian, et al., A Novel Handover Scheme for Seamless Wireless Connectivity in High-Speed Rail, 2011 IEEE 7th International Conference on Wireless and Mobile Computing, Networking and Communications (WiMob), 2011, pp. 230-236.

Aronsson, et al., Relay configurations, Advanced Radio InTerface Technologies for 4G SysTems, Jul. 29, 2011, 104 pages.

* cited by examiner

RELAY DEVICE AND ASSOCIATED VEHICLE AND METHOD

This application is a 371 of PCT/SE2013/050072, filed Jan. 30, 2013.

TECHNICAL FIELD

The invention relates to a relay device for providing relayed access to wireless devices to a cellular radio communication network.

BACKGROUND

In cellular radio communication networks where a group of wireless devices exhibit similar behaviour in terms of radio conditions and/or movement, relay devices can be used to provide relayed access for the wireless devices of the group. The relay device acts as a radio base station to the wireless devices and provides a combined radio connection link in the cellular radio communication network. When the group of wireless devices moves, a handover may be required. However, by using the relay device, the handover only needs to be performed for the relay device, and not for the individual wireless devices connected to the relay device, greatly simplifying resource requirements and failure risks at handover.

Nevertheless, when handovers do occur, there is always a risk of handover failure, particularly in the case relay devices being installed in fast moving vehicles. It would be greatly beneficial if there were to be a way in which the risk of handover failures is reduced for relay devices.

SUMMARY

It is an object to reduce the risk of handover failures for a relay device in a cellular radio communication network.

According to a first aspect, it is presented a relay device arranged to act as a relay to provide relayed access for at least one wireless device within a vehicle to a cellular radio communication network. The relay device comprises: a relay node device comprising a vehicle antenna for communicating with the at least one wireless device; a first directional antenna directed in a first direction, the first directional antenna being connected to the relay node device; and a second antenna which is not directed in the first direction, the second antenna being connected to the relay node device. The first directional antenna and second antenna are arranged to communicate with fixed radio base stations of the cellular radio communication network; and the first direction is essentially parallel to a direction of travel of the vehicle.

Using different directionality of the antennas, the radio communication capabilities are improved at least forwards or backwards (along the direction of travel). During handover, this effectively increases an overlap between the source cell and the target cell, from the viewpoint of the relay device. By increasing the overlap, the time for the handover from the source radio base station to the target radio base station is increased, which reduces the risk of handover failure.

The second antenna may be a second directional antenna directed in a second direction being essentially opposite to the first direction. This increases the overlap further, from the viewpoint of the relay device, which increases the time for handover even further.

The relay node device may consist of a single relay node. This is a cost effective solution while still providing the benefits of increased handover time.

The relay node device may consist of two relay nodes. This increase reliability and performance in some cases, e.g. by allowing separate demodulation and decoding from the two antennas.

For each one of the first directional antenna and the second directional antenna, a difference in directional gain at a constant elevation angle may be configured to achieve a desired extension of handover times based on an expected operating condition. In other words, the amount of directivity of the two antennas can be configured in order to achieve the desired handover time extension.

For each one of the first directional antenna and the second directional antenna, a maximal difference in directional gain at a constant elevation angle may be between 1.5 dB and 4.5 dB.

For each one of the first directional antenna and the second directional antenna, a maximal difference in directional gain at a constant elevation angle may be about 3 dB.

The first directional antenna may be arranged to increase gain in the first direction, relative to the second direction. This is one way of expressing the directivity of the first directional antenna.

The first directional antenna may be arranged to be provided at a first end in the first direction of the vehicle and the second directional antenna may be arranged to be provided at a second end in the second direction of the vehicle. Such an embodiment may improve radio characteristics of the first and second antennas and may thus provide an increased handover time for the relay device when in motion.

The second direction may deviate less than fifteen degrees from the opposite of the first direction. In this way, the second direction is essentially opposite the first direction.

According to a second aspect, it is presented a vehicle comprising the relay device according to any one of the preceding claims.

According to a third aspect, it is presented a method, performed in a relay device provided in a vehicle for providing relayed access for wireless devices within the vehicle to a cellular radio communication network. The relay device comprises: a relay node device comprising a vehicle antenna for communicating with at least one wireless device; a first directional antenna directed in a first direction, the first directional antenna being connected to the relay node device; and a second antenna which is not directed in the first direction, the second antenna being connected to the relay node device. The first directional antenna and second antenna are arranged to communicate with fixed radio base stations of the cellular radio communication network; and the first direction is essentially parallel to a direction of travel of the vehicle. The method comprises the step of: relaying communication between wireless devices in the vehicle and the fixed radio base stations.

The second antenna may be a second directional antenna directed in a second direction being essentially opposite to the first direction.

The method may further comprise the step of: when the relay device is in motion more along the first direction than in the second direction, assisting in a handover from a fixed radio base station in the second direction to a fixed radio base station in the first direction.

The method may further comprise the step of: when the relay device is in motion more along the second direction than in the first direction, assisting in a handover from a fixed radio base station in the first direction to a fixed radio base station in the second direction.

It is to be noted that any feature of the first, second or third aspects may, where appropriate, be applied to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
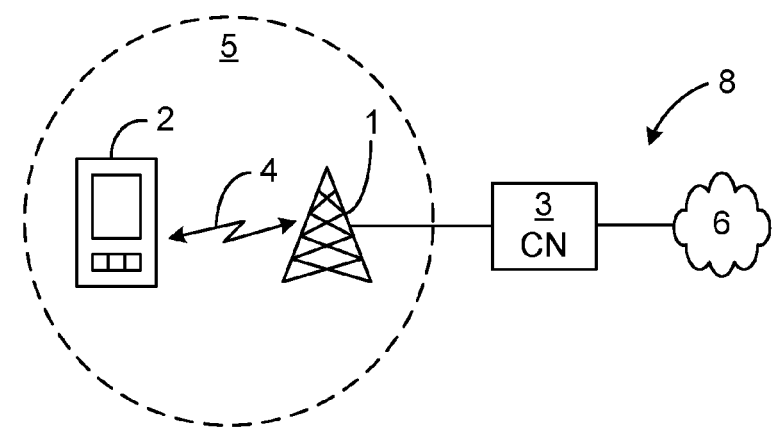
FIGS. 1A-B are a schematic diagrams illustrating a cellular communication network where embodiments presented herein can be applied.
Figure 1B:
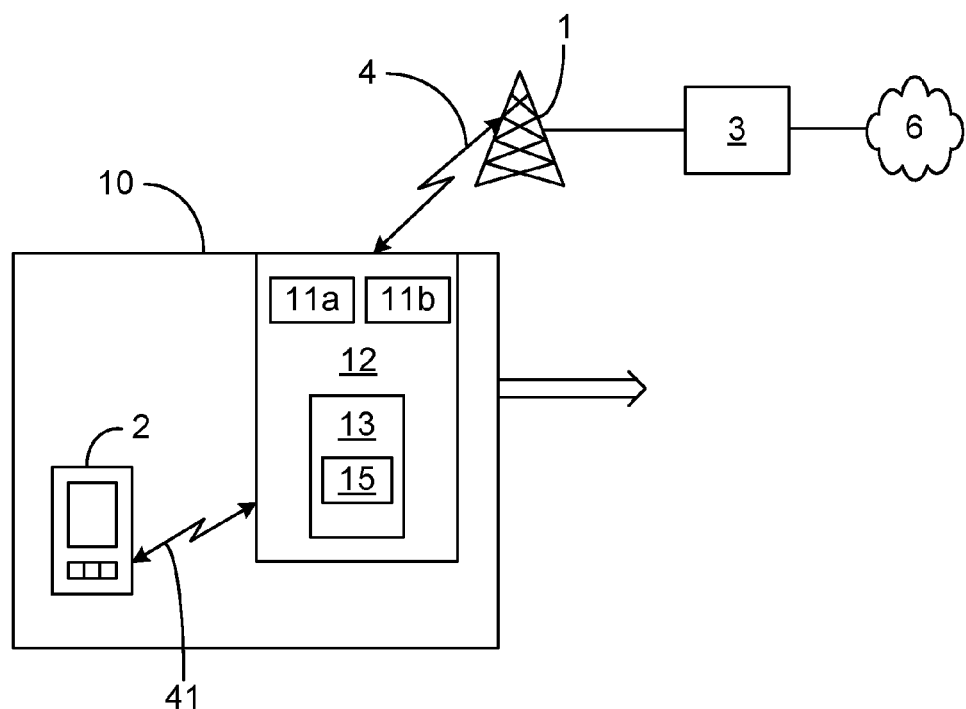

FIGS. 1A-B are a schematic diagrams illustrating a cellular communication network where embodiments presented herein can be applied.

FIG. 1A is a schematic diagram illustrating a cellular radio communication network 8 where embodiments presented herein can be applied. The cellular radio communication network 8 comprises a core network 3 and a plurality of fixed radio base stations 1, such as an evolved Node B, also known as eNode Bs or eNBs. The radio base station 1 could also be in the form of a Node B, BTS (Base Transceiver Station) and/or BSS (Base Station Subsystem). In any case, the radio base station 1 provides radio connectivity to one or more wireless devices 2. The term wireless device is also known as user equipment (UE), mobile communication terminal, mobile terminal, user terminal, user agent, etc.

The radio base station 1 is also connected to the core network 3 for connectivity to central functions and other networks 6. The cellular radio communication network 8 can e.g. comply with any one or a combination of LTE (Long Term Evolution), W-CDMA (Wideband Code Division Multiple Access), EDGE (Enhanced Data Rates for GSM Evolution, GPRS (General Packet Radio Service)), CDMA2000 (Code Division Multiple Access 2000), etc., or any future cellular radio communication standard, as long as the principles described hereinafter are applicable.

The communication between the wireless terminal 2 and the radio base station 1 occurs over a wireless radio interface 4. Each radio base station 1 provides coverage using a corresponding cell 5. In this example, the radio base station 1 has a single associated cell 5. However, it is to be noted that each radio base station can have multiple associated cells and the number of associated cells can differ between radio base stations. Furthermore, the cellular radio communication network 8 can have any suitable number of radio base stations and corresponding wireless radio interfaces and cells, supporting a suitable number of UEs.

In FIG. 1B there is a relay device 12 comprising a first directional antenna 11a and a second antenna 11b for communication with the fixed radio base station 1. The first directional antenna 11a is directional in its gain characteristics, as is explained in more detail below. The second antenna 11b is either a directional antenna like the first directional antenna 11a or an omnidirectional antenna. The characteristics of the antennas 11a-b are described in more detail below. The relay device 12 further comprises a relay node device 13 comprising at least one vehicle antenna 15 for communicating with the wireless device 2 within the vehicle 10. The at least one vehicle antenna 15 provides coverage throughout all or most of the vehicle 10 and can e.g. be implemented using a single antenna or, particularly in the case of larger/longer vehicles, using a distributed antenna system (DAS) or leaky cable.

The relay device 12 is installed in a vehicle 10 and thereby acts as a relay to provide relayed access for any wireless devices 2 within the vehicle 10. The wireless device 2 communicates with the relay device 12 as if it were a radio base station. In this way, during movement of the vehicle between cells, only the relay device is handed over from one radio base station to the next; the wireless devices are not handed over since they are still connected to the relay device 12.

The vehicle 10 can e.g. be any vehicle capable of carrying one or more wireless devices, such as a bus, a train, a car, a minibus, a boat, etc., and has a direction of travel indicated by the outline arrow.

Figure 2A:
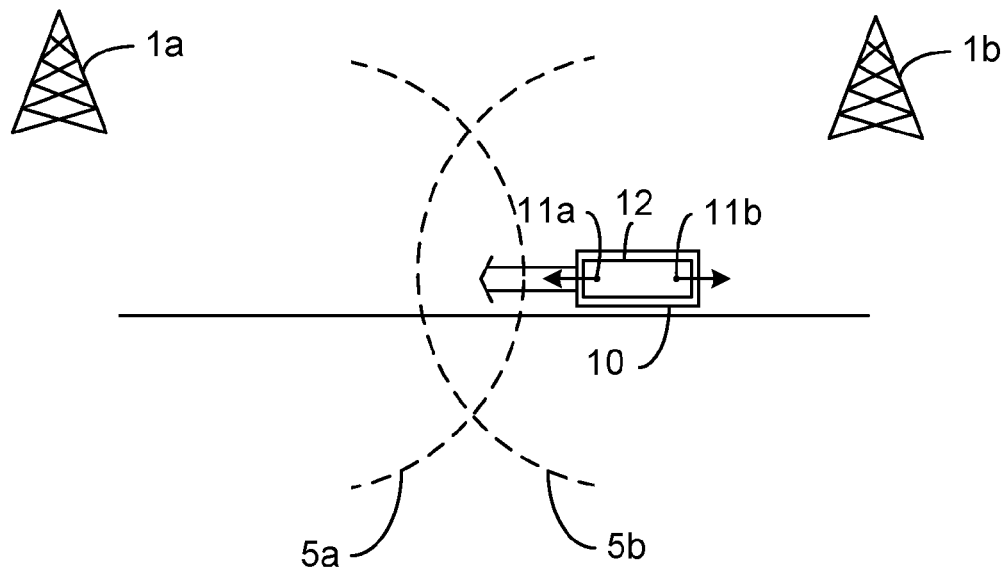
FIGS. 2A-B are schematic diagrams illustrating handover in a cellular communication network according to one embodiment.
Figure 2B:
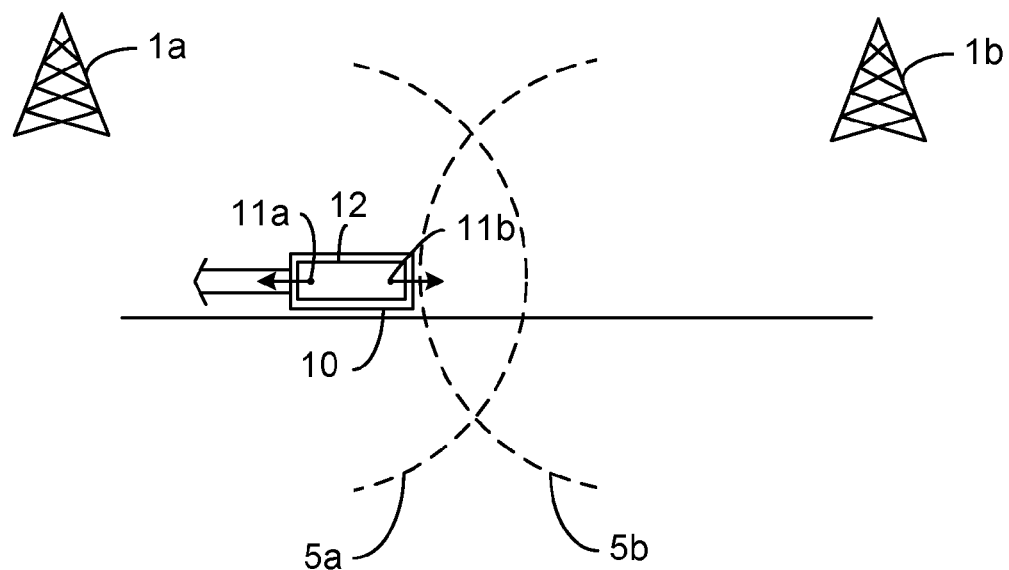

FIGS. 2A-B are schematic diagrams illustrating handover in a cellular radio communication network 8 according to one embodiment. A first fixed radio base station 1a provides radio coverage using a first cell 5a and a second fixed radio base station 1b provides radio coverage using a second cell 5b. The vehicle 10 has a direction of travel indicated by the outline arrow, i.e. from right to left in FIG. 2A. According to embodiments herein there are a first antenna 11a and a second antenna 11b in the relay device, by means of which the relay device 12 can communicate with radio base stations. In this embodiment, there is a first directional antenna 11a directed in a first direction and a second directional antenna 11b directed in a second direction, essentially opposite to the first direction. In one embodiment, opposite is interpreted as a deviation of less than fifteen degrees from the mathematical opposite.

In this way, the first directional antenna 11a can be directed in the direction of travel (forwards) of the vehicle 10 and the second directional antenna 11b can be directed in the opposite direction (backwards). Hence, the first directional antenna 11a improves radio communication capabilities in the direction of travel and the second directional antenna 11b improves communication capabilities in the opposite direction.

Consider now the case of FIG. 2B, which, compared to FIG. 2A, is later in time when the vehicle has moved in the direction of travel. In FIG. 2A, the relay device 12 is within the coverage of the second cell 5b and in FIG. 2B, the relay device 12 is within the coverage of the first cell 5a, requiring that a handover has occurred from the second radio base station 1b to the first radio base station. Using the directional antennas 11a-b, the radio communication capabilities are improved both forwards and backwards, effectively increasing the overlap between the first cell 5a and the second cell 5b, from the viewpoint of the relay device 12. By increasing the overlap, the time for the handover from the second radio base station 1b to the first radio base station 1a is increased, which reduces the risk of handover failure.

The first antenna and the second antennas 11a-b can e.g. be combined using suitable analogue components, e.g. couplers etc. This combination can occur prior to connecting the antennas 11a-b to the relay device. Alternatively, the antennas 11a-b are connected at separate ports of the relay device 12 and analogue combination of the antennas 11a-b is performed within the relay device 12. Alternatively, the antennas 11a-b are connected at separate ports of the relay device 12, after which separate demodulation and decoding occurs.

It is to be noted that it is sufficient that, as long as there is a difference in directional coverage between the first and second antennas 11a-b, the combined radio characteristics are improved and the time for the handover is increased for the relay device.

The difference in directional gain at a constant elevation angle can be configured to achieve a desired extension of handover times based on an expected operating condition.

The expected operating condition can for example be knowledge or predictions of the rate of change of the relative signal strengths at the cell borders between two radio base stations. It can also include the handover settings (such as detection thresholds, handover thresholds, timers, etc.) that are used in the radio communication network or in the particular cells.

Figure 3A:
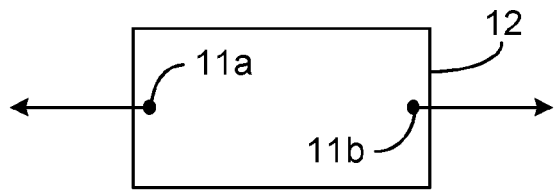
FIGS. 3A-3C are schematic diagrams illustrating embodiments of relay devices of FIGS. 2A-B and FIG. 5A-B.
Figure 3B:
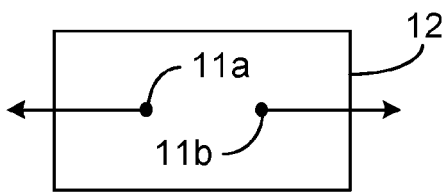
Figure 3C:
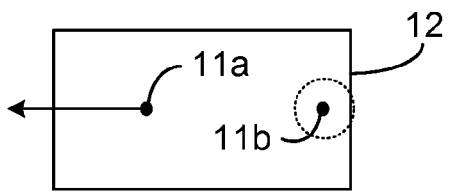

FIGS. 3A-3C are schematic diagrams illustrating embodiments of relay devices of FIGS. 2A-B and FIG. 5A-B. In FIGS. 3A-B, the relay device comprises a first directional antenna 11a and a second directional antenna 11b. The first directional antenna 11a is directed in the first direction and the second directional antenna is directed in the second direction, essentially opposite to the first direction. In other words, the first directional antenna 11a is arranged to increase gain in the first direction, relative to the second direction.

In the embodiment of FIG. 3A, the first directional antenna 11a is provided at a first end (in the first direction of the vehicle 10) and the second directional antenna 11b is provided at a second end (in the second direction of the vehicle 10). Such an embodiment may improve radio characteristics of the first and second antennas 11a-b and may thus provide a longer handover time for the relay device 12 when in motion, compared to the embodiment of FIG. 3A.

In the embodiment of FIG. 3B, compared to the embodiment of FIG. 3A, the first and second antennas are located closer to each other. This may make it simpler to implement the relay device 12 since wiring to connect the antennas 11a-b is shorter and potentially less complicated.

In FIG. 3C an embodiment is shown where the relay device 12 comprises a first antenna 11a being a directional antenna and the second antenna 11b' is here an omnidirectional antenna. While not as efficient as the embodiments of FIG. 3A-B, this embodiment could be implemented with a second antenna 11b' being simpler and thus less costly. Since the first antenna 11a is directional, the combined characteristics of the two antennas 11a, 11b' still provide a longer handover time compared to the case of a single (or even two) omnidirectional antennas, and also compared to a case with single directional antenna.

Figure 4:
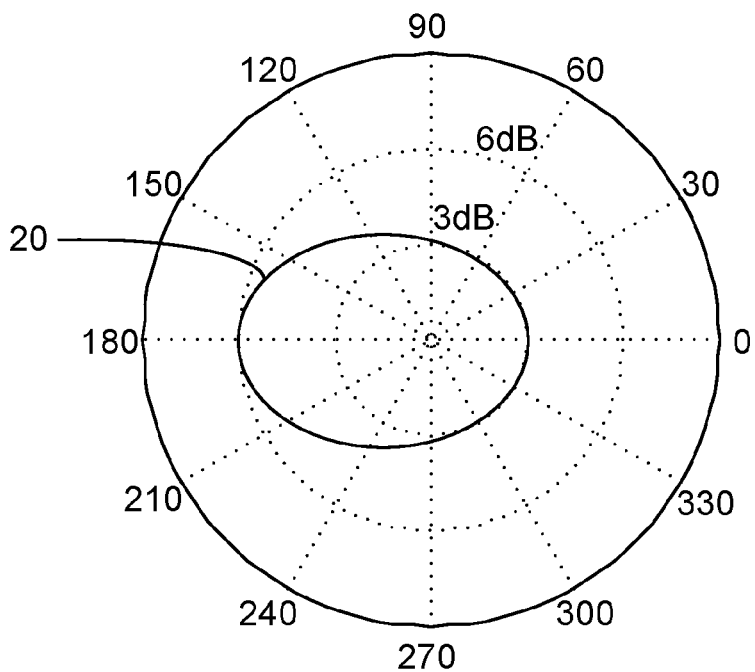
FIG. 4 is a schematic diagram illustrating radiation patterns in one embodiment of the directional antennas of FIGS. 3A-C.

FIG. 4 is a schematic diagram illustrating radiation patterns of the directional antennas of FIGS. 3A-C at a constant elevation angle. A gain line 20 indicates the gain in various directions of a directional antenna. The gain is at a maximum at about 180 degrees, with about 6 dBi and is at a minimum at about 0 degrees with about 3 dBi. Hence, a maximal difference in directional gain at a constant elevation angle is about 3 dBi for a directional antenna whose radiation pattern is illustrated in FIG. 4. In one embodiment, a maximal difference in directional gain at a constant elevation angle is anywhere between 1.5 dB and 4.5 dB. The desired radiation pattern, i.e. directability, can e.g. be achieved using several antenna elements and/or reflectors.

Figure 5A:
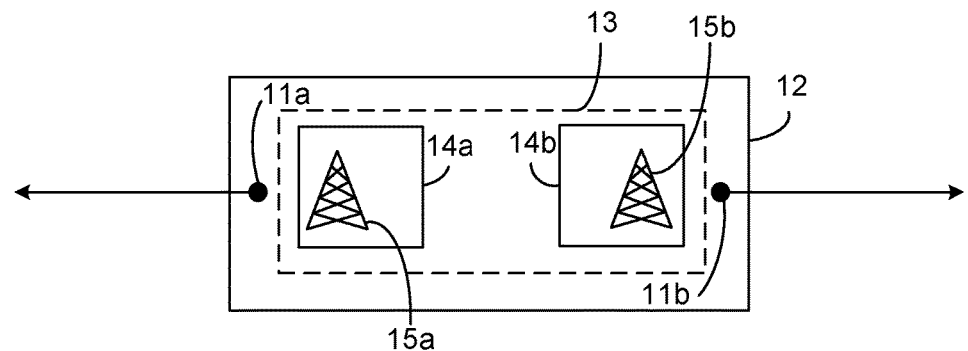
FIGS. 5A-B are schematic diagrams illustrating embodiments of the relay device of FIGS. 2A-B.
Figure 5B:
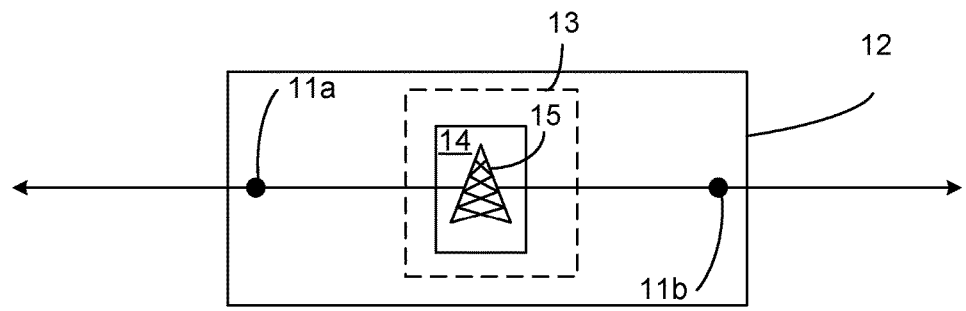

FIGS. 5A-B are schematic diagrams illustrating embodiments of the relay device of FIGS. 2A-B. These diagrams are used to illustrate how the relay node device 13 can be implemented using one or two relay nodes. It is to be noted that the relay node device 13 does not need to correspond to a physical entity per se, but can thought of as a convenient way of wording the relationship between different entities.

In FIG. 5A an embodiment is illustrated wherein the relay device 12 comprises a relay node device 13 consisting of a first relay node 14a and a second relay node 14b. The first relay node 14a is connected to the first antenna 11a and comprises a first vehicle antenna 15a for communication with wireless devices in the vehicle. The second relay node 14b is connected to the second antenna 11b and comprises a second vehicle antenna 15b, also for communication with wireless devices in the vehicle. By having two relay nodes 14a-b and two vehicle antennas 15a-b, coverage and transmission quality within the vehicle 10 can be improved, e.g. by using MBSFN (Multicast-Broadcast Single Frequency Network) and CoMP (Coordinated Multi-Point) transmission using the relay nodes 14a-b.

In FIG. 5B an embodiment is illustrated wherein the relay device 12 comprises a relay node device 13 consisting of a single relay node 14. Both the first antenna 11a and the second antenna 11b are connected to the single relay node.

Figure 6A:
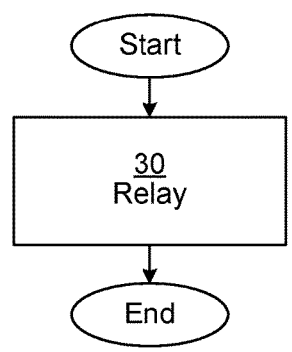
FIGS. 6A-B are flow charts illustrating methods which can be performed in the relay device of FIGS. 2A-B and FIGS. 5A-B.
Figure 6B:
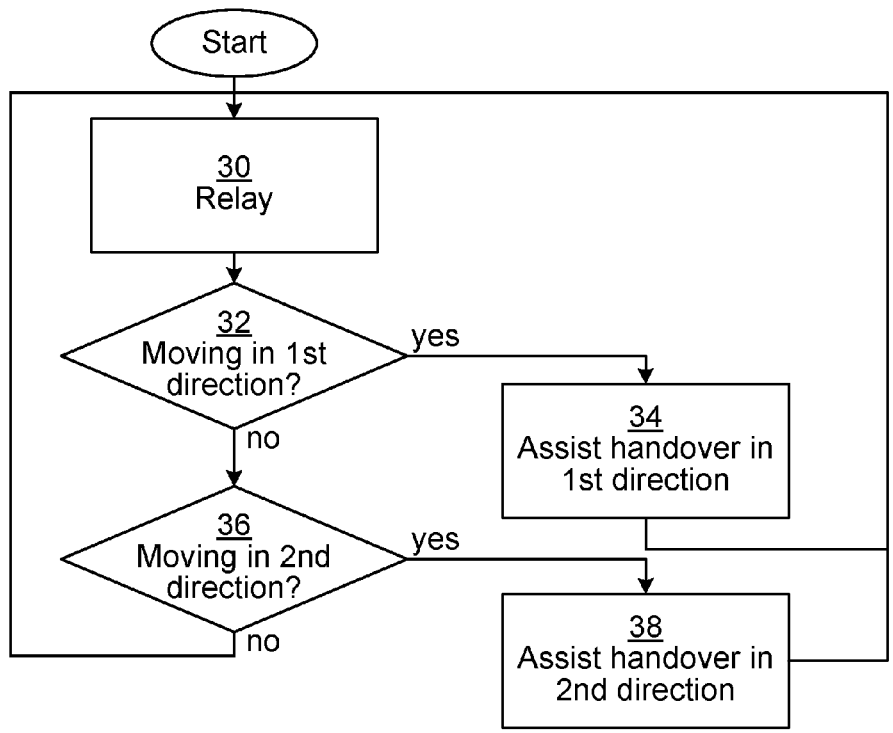

FIGS. 6A-B are flow charts illustrating methods which can be performed in the relay device of FIGS. 2A-B and FIGS. 5A-B. In FIG. 6A, there is a single relay step 30. In the relay step 30, the relay device relays communication between any connected wireless devices in the vehicle and a fixed radio base station as described above.

In FIG. 6B a method is illustrated where also handovers are considered. After the relay step 30, the method continues to a conditional moving in $1^{st}$ direction step 32.

In the conditional moving in $1^{st}$ direction step 32, the relay node determines whether the relay device is travelling along a first (predetermined) direction. The first direction can be predefined in relation to the direction of travel of the vehicle. For example, the first direction can be the forward direction of the vehicle. When it is determined that the relay device is moving in the first direction, the method continues to an assist handover in 1$^{st}$ direction step 34. Otherwise the method continues to a conditional moving in 2$^{nd}$ direction step 36.

In the conditional moving in 2$^{nd}$ direction step 36, the relay node determines whether the relay device is travelling along a second (predetermined) direction. As for the first direction, the second direction can be predefined in relation to the direction of travel of the vehicle. For example, the second direction can be the backward direction of the vehicle. When it is determined that the relay device is moving in the second direction, the method continues to an assist handover in 2$^{nd}$ direction step 38. Otherwise the method returns to the relay step 30.

In one embodiment, handover is performed by performing cell measurements to evaluate potential handovers to new candidate cells while travelling in any direction through the cellular landscape.

Figure 7:
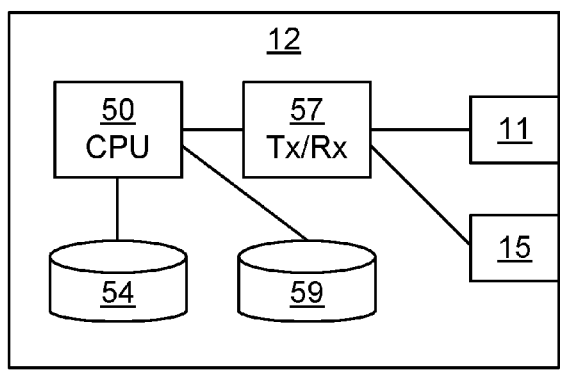
FIG. 7 is a schematic diagram illustrating elements of the relay device of FIGS. 2A-B and FIGS. 5A-B.

FIG. 7 is a schematic diagram illustrating elements of the relay device 12 of FIGS. 2A-B and FIGS. 5A-B. A processor 50 is provided using any combination of one or more of a suitable central processing unit (CPU), multiprocessor, microcontroller, digital signal processor (DSP), application specific integrated circuit etc., capable of executing software instructions stored in a computer program product 54, e.g. in the form of a memory. The processor 50 can be configured to execute the method described with reference to FIGS. 6A-B above.

The computer program product 54 can be a memory being any combination of read and write memory (RAM) and read only memory (ROM). The memory also comprises persistent storage, which, for example, can be any single one or combination of solid state memory, magnetic memory, or optical memory.

The relay device 12 further comprises a data memory 59, which is a read-and-write memory. The data memory 59 may also comprise persistent storage, which, for example, can be any single one or combination of magnetic memory, optical memory, solid state memory or even remotely mounted memory. Optionally, the computer program product 54 and the data memory 59 can form part of the same memory device.

The relay device 12 also comprises one or more transceivers 57, comprising analogue and digital components, and a suitable number of antennas (at least two) 11 for radio communication with uplink radio base stations. Also, one or more antennas 15 are used in communication with the wireless nodes connected to the relay device.

The processor 50 controls the general operation of the radio base station, e.g. by sending control signals to the transceiver 55 and receiving reports from the transceiver 55 of its operation.

Other components of the relay device 12 are omitted in order not to obscure the concepts presented herein, included real or virtual intermediate levels such as relay node device and relay node.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A relay device arranged to be provided in a vehicle to act as a relay to provide relayed access for at least one wireless device within the vehicle to a cellular radio communication network, and configured to reduce a risk of handover failure when the vehicle moves from a first cell to a second cell, the relay device comprising:
    a relay node device comprising a vehicle antenna for communicating with the at least one wireless device within the vehicle;
    a first directional antenna directed in an essentially rearward direction to increase directional gain toward a first base station serving the first cell, the first directional antenna being connected to the relay node device;
    a second directional antenna directed in an essentially forward direction to increase directional gain toward a second base station serving the second cell, the second directional antenna being connected to the relay node device; and
    circuitry configured to combine signals of the first directional antenna and the second directional antenna,
    wherein the increased directional gain toward the first and second base stations effectively increases an overlap of the first and second cells, thereby increasing handover time and reducing the risk of handover failure.

2. The relay device according to claim 1, wherein the relay node device consists of a single relay node.

3. The relay device according to claim 1, wherein the relay node device consists of two relay nodes.

4. The relay device according to claim 1, wherein for each one of the first directional antenna and the second directional antenna, a difference in directional gain at a constant elevation angle is configured to achieve a desired extension of handover time based on an expected operating condition.

5. The relay device according to claim 1, wherein for each one of the first directional antenna and the second directional antenna, a maximal difference in directional gain at a constant elevation angle is between 1.5 dB and 4.5 dB.

6. The relay device according to claim 1, wherein for each one of the first directional antenna and the second directional antenna, a maximal difference in directional gain at a constant elevation angle is about 3 dB.

7. The relay device according to claim 1, wherein the first directional antenna is arranged to be provided at a rear end of the vehicle and the second directional antenna is arranged to be provided at a front end of the vehicle.

8. The relay device according to claim 1, wherein the essentially forward direction deviates less than fifteen degrees from the opposite of the essentially rearward direction.

9. A vehicle comprising the relay device according to claim 1.

10. A method, performed in a relay device provided in a vehicle, the method comprising:
    relaying communication between wireless devices in the vehicle and fixed radio base stations of a cellular radio communication network; and
    reducing a risk of handover failure when the vehicle moves from a first cell to a second cell;
    wherein the relay device includes:
        a relay node device having a vehicle antenna for communicating with at least one of the wireless devices in the vehicle;
        a first directional antenna directed in an essentially rearward direction to increase directional gain toward a first base station serving the first cell, the first directional antenna being connected to the relay node device;
        a second directional antenna directed in an essentially forward direction to increase directional gain toward a second base station serving the second cell, the second directional antenna being connected to the relay node device; and circuitry configured to combine signals of the first directional antenna and the second directional antenna, wherein the increased directional gain toward the first and second base stations effectively increases an overlap of the first and second cells, thereby increasing handover time and reducing the risk of handover failure.

* * * * *